United States Patent
Grundvig et al.

[19]

[11] Patent Number: 6,061,435
[45] Date of Patent: May 9, 2000

[54] CORDLESS TELEPHONE SYSTEM HAVING A HANDSET WITH NON-TELEPHONE FUNCTIONALITY

[75] Inventors: Jeffrey Paul Grundvig, Macungie; Scott Wayne McLellan, Albany Township, Berks County; John P. Veschi, Fogelsville, all of Pa.

[73] Assignee: Lucent Technologies Inc., Murray Hill, N.J.

[21] Appl. No.: 08/943,535

[22] Filed: Oct. 3, 1997

[51] Int. Cl.⁷ .............................. H04M 11/00; H04B 1/00
[52] U.S. Cl. ............................. 379/102.03; 379/110.01; 379/142; 455/420
[58] Field of Search ..................... 379/102.03, 102.02, 379/102.01, 142, 110.01, 93.23; 455/462, 415, 420

[56] References Cited

U.S. PATENT DOCUMENTS

| | | | |
|---|---|---|---|
| 5,128,987 | 7/1992 | McDonough et al. | 379/102.03 |
| 5,138,649 | 8/1992 | Krisbergh et al. | 455/420 |
| 5,233,646 | 8/1993 | Kuromi | 379/102.03 |
| 5,349,638 | 9/1994 | Pitroda et al. | 379/93.23 |
| 5,410,326 | 4/1995 | Goldstein | 379/102.07 |
| 5,528,673 | 6/1996 | Rosenthall | 379/102.03 |
| 5,553,125 | 9/1996 | Martensson | 379/142 |
| 5,570,415 | 10/1996 | Stretton et al. | 379/102.03 |
| 5,671,267 | 9/1997 | August et al. | 455/420 |
| 5,752,195 | 5/1998 | Tsuji et al. | 455/415 |
| 5,802,467 | 9/1998 | Salazar et al. | 455/420 |
| 5,805,677 | 9/1998 | Ferry et al. | 379/93.35 |
| 5,875,239 | 2/1999 | Koralewski et al. | 279/142 |

*Primary Examiner*—Stella Woo
*Attorney, Agent, or Firm*—John P. Veschi

[57] ABSTRACT

In a first embodiment according to the invention, a cordless telephone handset of a cordless telephone system includes a user input unit, a signal processor and an output driver. The signal processor is coupled to the user input unit. The signal processor processes user input received via the user input unit. The output driver receives processed information from the signal processor and selectively outputs the processed information to at least one of a plurality of output devices. For example, in one embodiment the user input unit is a keypad, and the signal processor selectively processes the user input as telephone control information and as television control information. In a second embodiment according to the invention, a method of receiving an incoming call in a cordless telephone includes the steps of receiving an incoming call telephone signal, and outputting a television control signal in response to the incoming call telephone signal.

35 Claims, 1 Drawing Sheet

CORDLESS TELEPHONE SYSTEM HAVING A HANDSET WITH NON-TELEPHONE FUNCTIONALITY

FIELD OF THE INVENTION

This invention is directed to the field of cordless telephones.

BACKGROUND OF THE INVENTION

Cordless telephones typically comprise a base unit and a handset. The base unit is typically connected to a telephone network through a telephone line interface. The handset is typically coupled with the base unit via an RF link. For example, conventional cordless telephones have an RF link in the 46–49 MHz frequency range, and more recent cordless telephones have an RF link in a frequency band near 900 MHz. The RF link between the handset and the base unit is typically divided into two portions, such as an uplink from the handset to the base unit at a first frequency, such as 46 MHz, and a downlink from the base unit to the handset at a second frequency, such as 49 MHz.

Cordless telephone handsets typically incorporate a user input mechanism, such as a keypad, through which a user inputs information, such as a telephone number corresponding to an outgoing telephone call. A processor, such as a microprocessor, digital signal processor (DSP), application specific integrated circuit (ASIC), or logic within the handset interprets the user input and communicates the user input via the uplink to the base unit where it is in turn processed and/or forwarded to the telephone network through the telephone line interface. Thus, when placing an outgoing telephone call, a user typically enters, via the keypad, the telephone number to be called. The processor in the handset typically processes the user input and communicates the input telephone number to the base unit via the uplink. The base unit typically includes a processor, such as a microprocessor, DSP or ASIC, that creates a signal, such as a dual tone multifrequency (DTMF) signal, which corresponds to the key of the keypad activated by the user, and is output to the telephone network via the telephone line interface. By receiving a series of DTMF signals, the telephone network is thus alerted to the user's intention to initiate an outgoing call, and informed of the number to which the outgoing call is desired.

Cordless telephone handsets also typically include a microphone and a speaker respectively positioned internal to a mouthpiece and an earpiece. When communicating during a telephone call, a user speaks into the microphone in the mouthpiece and listens to audible sounds produced by the speaker in the earpiece. Typically, sounds produced by the user are converted into electrical signals by the microphone. In an "analog" configuration, these electrical signals are then typically transmitted via the uplink to the base unit. In a "digital" configuration, on the other hand, the electrical signals are digitized by an analog-to-digital (A/D) converter, processed by the processor in the handset, and transmitted as digital signals via the uplink to the base unit. In the analog configuration, the base unit forwards the electrical signals to the telephone network via the telephone line interface. In the digital configuration, on the other hand, the base unit processor processes the digital signals, which are then converted to analog signals by a digital-to-analog (D/A) converter and then forwarded to the telephone network via the telephone line interface.

An advantage of a cordless telephone, when compared to a conventional corded telephone, is that the cordless telephone allows a user to "roam" while entering into or engaging in a telephone call. The area within which the user can roam is limited by the RF link. Typically, the range of the RF link allows a user to roam throughout a house and within a surrounding area while maintaining connectivity via the RF link to the base unit. The range of more recent cordless telephones has been further extended to more than a kilometer. As long as the user is within range of the base unit, the user can place and receive telephone calls via the handset.

The ability to roam with the telephone handset results in a unique set of problems. For example, a roaming user may be a distance from the base unit when a telephone call is completed, and after completing the telephone call the roaming user may place the handset down in a convenient location. At a later time, when the user wishes to place an outgoing telephone call, the user may forget the location where the user placed the handset, and thus be unable to locate the handset. To address this problem, some cordless telephones include a "page/find" feature, through which the user presses a button on the base unit (which, because it is connected to the telephone line interface, is stationary, and thus its location is presumably always known by the user) to cause the handset to emit an audible alarm to enable the user to locate the handset.

Frequently, a user of a cordless telephone may roam within a television viewing area, such as a family room, while engaged in a telephone conversation. When a s telephone conversation ends, the user may place the handset in a convenient location, such as on top of a coffee table or an end table proximate to a couch or chair within which the user was sitting during the telephone conversation. This convenient location may also be the present location of one or more remote control units associated with home entertainment equipment, such as a television, a stereo, a videocassette recorder (VCR) or other audio/video equipment. This situation presents many problems.

For example, when the user is alerted by a sound such as a telephone ring to the presence of a new incoming telephone call, the user must distinguish between the remote control unit(s) and the cordless telephone handset to determine which device is the cordless telephone handset. This can be a difficult task, especially if the user is engaged in nighttime television viewing in a low illumination setting. Also, the television or stereo may be set at a volume setting that is too loud for the user to engage in conversation via the telephone handset. This situation typically requires the user to move away from the television or stereo speakers in order to reduce the effect of the television or stereo on the telephone conversation. Alternatively, the user may elect to reduce the volume setting or mute the volume setting of the television or stereo. To achieve this volume control, the user may attempt to locate the remote control unit associated with the television or stereo at the same time the user is locating the cordless telephone handset. Further, the user may attempt to control the volume setting of the television or stereo via the remote control unit (typically by pressing one or more buttons on the remote control unit), while answering the incoming telephone call (typically by pressing a button on the cordless telephone handset). This can be a difficult maneuver which may result in the user accidentally disconnecting the telephone call.

Further, although the user may subscribe to a caller ID service, through which call related information is provided with incoming telephone calls, the caller ID information may be displayed at the location of the base unit or may be difficult to see during low illumination television viewing.

This situation may cause the user to elect to answer a call the user otherwise would not have answered, which can be a problem in and of itself, and may further be a problem if answering the call causes the user to unnecessarily interrupt a potentially important television viewing moment.

SUMMARY OF THE INVENTION

In a first embodiment according to the invention, a cordless telephone handset of a cordless telephone system includes a user input unit, a signal processor and an output driver. The signal processor is coupled to the user input unit. The signal processor processes user input received via the user input unit. The output driver receives processed information from the signal processor and selectively outputs the processed information to at least one of a plurality of output devices. For example, in one embodiment the user input unit is a keypad, and the signal processor selectively processes the user input as telephone control information and as television control information.

In a second embodiment according to the invention, a method of receiving an incoming call in a cordless telephone includes the steps of receiving an incoming call telephone signal, and outputting a television control signal in response to the incoming call telephone signal.

DETAILED DESCRIPTION

Figure 1:
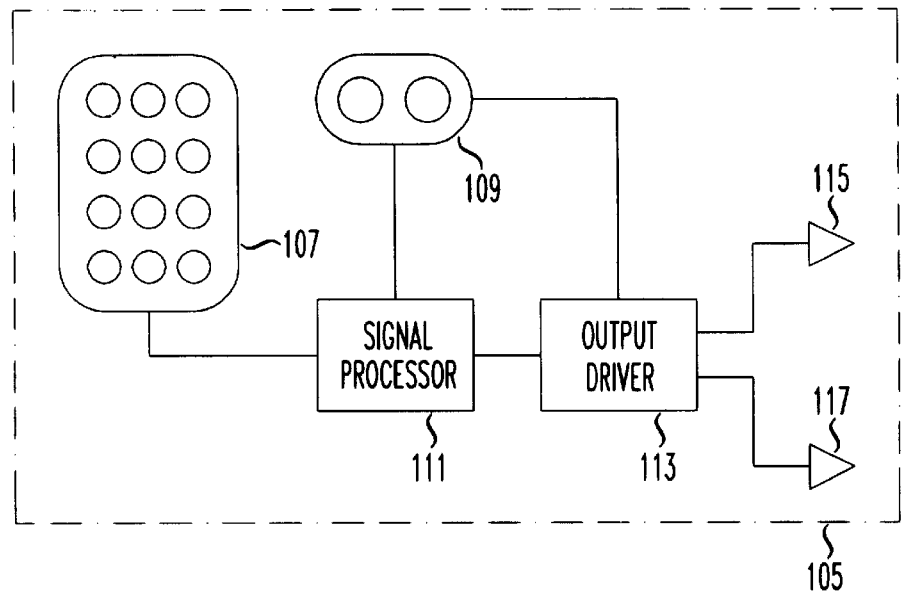
FIG. 1 is a simplified block diagram of a cordless telephone handset according to the invention.

A simplified block diagram of cordless telephone handset 105 is shown in FIG. 1. Cordless telephone handset 105 includes a user input unit, such as keypad 107, a mode selector 109, a signal processor 111, and an output driver 113. The signal processor 111 is coupled to the user input unit 107 and the mode selector 109. The signal processor 111 processes user input received via the user input unit 107 based on a mode provided by the mode selector 109. The output driver 113 receives processed information from the signal processor and selectively outputs the processed information to at least one of a plurality of output devices based on the mode.

For example, cordless telephone handset 105 includes first and second output devices 115 and 117. In an exemplary embodiment, first output device 115 is a television output device and second output device 117 is a telephone output device. The telephone output device comprises, for example, a transmitting element of an uplink portion of an RF link between the cordless telephone handset 105 and a cordless telephone base unit. The telephone output device may be conveniently packaged as part of an RF link interface unit encompassing both the transmitting element of the uplink portion and a receiving element of a downlink portion, and thus envisioned as an input/output device or portion thereof. If the device is viewed as an "input/output" device, of course, then driver 113 can also be viewed as an "input/output" driver. As discussed earlier, RF links are well known to those of skill in the art, and many types of RF links can be found in conventional cordless telephone systems.

The television output device comprises, for example, an infrared signaling unit similar to infrared signaling units incorporated into conventional television remote control units. As with the telephone output device, the television output device can be part of an input/output device. Of course, use of an infrared signaling unit as the television output device and use of the RF uplink transmitting element as the telephone output device are described herein merely by way of example and not of limitation. Other types of signaling and/or communicating units can serve as these output devices and fall within the scope of the invention.

User input unit 107, described in this example as a keypad, includes a plurality of keys configured, for example, in a grid. Each key in the keypad is associated with a unique number or other unique function. For purposes of illustration, twelve keys are shown in the grid of keypad 107. Any number of keys, of course, can be employed according to the invention. The number of keys employed is likely dictated by the applications being driven by the cordless telephone handset 105. For example, a telephone keypad conventionally includes twelve keys, one for each digit from 0–9, and one each for the # key and the * key. Similarly, a television remote control unit conventionally includes at least the same twelve keys, and may include additional keys. If television remote control requirements dictate, a greater number of keys may be included in keypad 107.

The mode selector 109 is, in this example, a two position device, such as a switch. According to the invention, when the mode selector 109 is in a television position, the activation of keypad 107 causes signal processor 111 to process the information received from keypad 107 as television control information, and causes output driver 113 to drive the television control information to second output device 117.

Thus, for example, if a user wishes to change a television channel to channel 32, and thus activates the 3 key and then activates the 2 key while the mode selector 109 is in the television mode, signal processor 111 will receive indications from keypad 107, such as electrical signals, informing signal processor 111 that these keys have been activated. Signal processor 111 will also receive an indication from, or have been previously informed by, the mode selector 109 that the handset 105 is in the television mode, and will thus process the indications from keypad 107 as television control indications. Signal processor 111 will prepare output signals appropriate to cause second output device 117 to output infrared signals to inform a television receiving the infrared signals that the user activated the 3 key and the 2 key. Output driver 113 will receive these output signals from signal processor 113 and forward these output signals to second output device 117. Second output device 117 will thus output the appropriate infrared signals, and the television will then act in a conventional manner to change its channel to channel 32.

Alternatively, if the user wishes to place an outgoing telephone call, the user causes mode selector 109 to be in the telephone mode. The user then operates cordless telephone handset 105 as a conventional cordless telephone handset, by, for example, activating a key to cause the telephone to transition to an off-hook state, and then entering a telephone number to be called via keypad 107. Signal processor 111 receives indications of the activated keys from keypad 107, and processes the indications as telephone control indications. Output driver 113 receives output signals generated by signal processor 113 and outputs these signals to first output device 115. First output device 115 thus outputs control signals to the telephone base unit. For example, first output device 115 outputs RF signals on the uplink to the base unit. As mentioned earlier, first output device 115 can be part of a transceiver that also receives RF downlink information from the base unit and passes this information to signal processor 111.

Mode selector 109, signal processor 111, output driver 113, and portions of output devices 115 and 117 can be incorporated into a single integrated circuit. Alternatively, these devices can each be an individual integrated circuit as part of a chip set. Mode selector 109 can be controlled, for example, by user input, such as user input provided via keypad 107 and processed by signal processor 111. Mode selector 109 may also be controlled by program control according to a program run by signal processor 111. The program can be stored in an internal memory in signal processor 111, or can be stored in a memory external to signal processor 111, either as part of the same integrated circuit as signal processor 111, or as part of a separate integrated circuit.

The aforementioned embodiments of the invention describe a cordless telephone handset that uses the same user input unit (e.g., keypad 107) for both user control of a cordless telephone system and for user control of a television. Of course, one or more portions of the user input unit, such as one or more keys of a keypad, may be used only for control of the cordless telephone system or only for control of the television. For example, a cordless telephone handset according to the invention can include separate user input units for each of the television and the telephone, with internal circuitry of the handset preferably being shared by and responsive to each of the user input units to control the appropriate device. The use of two input units to control two devices is, of course, purely by way of example and not of limitation, and any number of user input units associated with any number of devices are possible within the scope of the invention.

In an alternative embodiment according to the invention, the mode of the mode selector 109 is controlled by a program that is influenced by external events other than user input. For example, according to one program according to the invention, upon receipt of a signal indicating the initiation of an incoming telephone call, received, for example, via a downlink portion of the RF link, the mode selector can switch between the telephone mode and the television mode to cause integrated control of both the telephone and the television.

An example of integrated control according to the invention is for the signal processor to cause a signal to be output from second output device 117 via output driver 113 to control a volume setting of a television in response to the receipt of a signal indicating the initiation of an incoming telephone call. For example, a muting signal can be output, causing a volume setting of a television to be muted. Alternatively, a low volume setting signal can be output, causing a volume setting of a television to be reduced to a low level. This form of integrated control eliminates the need for the user to independently reduce or mute the volume setting of the television while answering the incoming telephone call.

In one alternative, the volume control or muting of the television can be terminated based on a parallel set detection indicating that a parallel telephone has transitioned to an off-hook state. For example, the cordless telephone base unit can detect that a parallel set is in an off-hook state, and can provide a corresponding signal to the cordless telephone handset via the RF link. In response to this signal, the cordless telephone handset, according to this embodiment, will terminate the volume control of the television.

Another example of integrated control according to the invention is for the signal processor to cause a signal to be output from the second output device 117 via output driver 113 to control a television to display call related information associated with the incoming call. For example, caller ID information, such as the telephone number and name associated with a telephone initiating the incoming call, can be displayed on the television to allow the user to determine if the user wishes to interrupt the television viewing experience to engage in a telephone conversation with the incoming caller. The user can, for example, activate a specific key on the keypad in order to accept the incoming call, with a default that the incoming call will not be accepted (and will presumably be handled by a telephone answering device) if the specific key is not activated within a predetermined period of time. Alternatively, the system can be configured such that the user activates a specified key to not accept the call and forward the call to a telephone answering device, with a default that the television will be muted and the call put through if the specified button is not activated within a predetermined period of time.

Another type of information that can be displayed on the television is an indication of a parallel set transitioning to an off-hook state. This indication can be provided on the television screen, for example, to alert a user engaged in a telephone call to the fact that someone may be listening to the conversation from another phone (parallel set). Such a display, for example, could also identify the telephone that has transitioned to the off-hook state. For example, when a parallel set in the Master Bedroom transitions to an off-hook state, the cordless telephone base unit can detect this in a conventional manner and provide a corresponding indication to the cordless telephone handset via the RF link. The indication may merely inform the handset that a parallel set is now off-hook, or may specifically identify the set that is off-hook. The handset can respond to this indication by producing an appropriate infrared signal to control the television to display parallel set detect status. For example, the television can display UPSTAIRS PHONE OFF HOOK. Other signaling, such as audible signaling via the television, is also possible.

The above examples describe a situation where user control is achieved via the user input unit configured as keypad 107. Alternative forms of user input are also possible. For example, voice activated user input can be employed, wherein the user says a specific word or phrase, such as "YES", if the user wishes to accept the call, and says another specific phrase, such as "NO", if the user does not wish to accept the call. In this example, the user input unit can take the form of a voice recognition module specifically programmed to interpret the user input. Preferably, the voice recognition module includes the ability to distinguish between the voice of the user and the sounds emanating from the television, for example through spectral analysis or proximity analysis.

In addition to causing the television to display caller ID data and to adjust the volume of the television, a control signal from the second output device 117 can cause the television to output a telephone call alert signal, such as a sound, to alert the user that an incoming call is being received. This alert signal can be provided in place of or in addition to a conventional telephone ringing signal or other alerting mechanism inherent in the cordless telephone handset 105.

Figure 2:
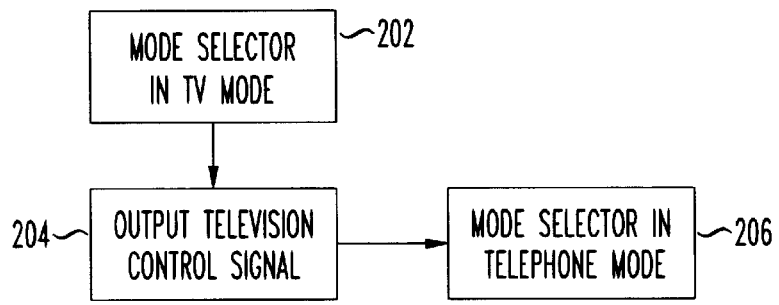
FIG. 2 is a flowchart showing a method of operation of a cordless telephone handset according to the invention.

FIG. 2 provides a flowchart of operation of signal processor 111 according to one embodiment of the invention. In step 202, signal processor 111 places mode selector 109 in the television mode upon receipt of an incoming call telephone signal from input/output driver 113 and first input/output unit 115. In step 204, signal processor 111 outputs a television control signal via input/output driver 113 and second input/output unit 117. As discussed above, the television control signal can include, for example, a television volume adjust signal, a television volume muting signal, a television call alert signal, a television caller-ID display signal, a parallel set-based unmuting signal, and a parallel set alert signal. Next, in step 206, signal processor 111 places mode selector 109 in the telephone mode to enable answering of the call by the user.

Figure 3:
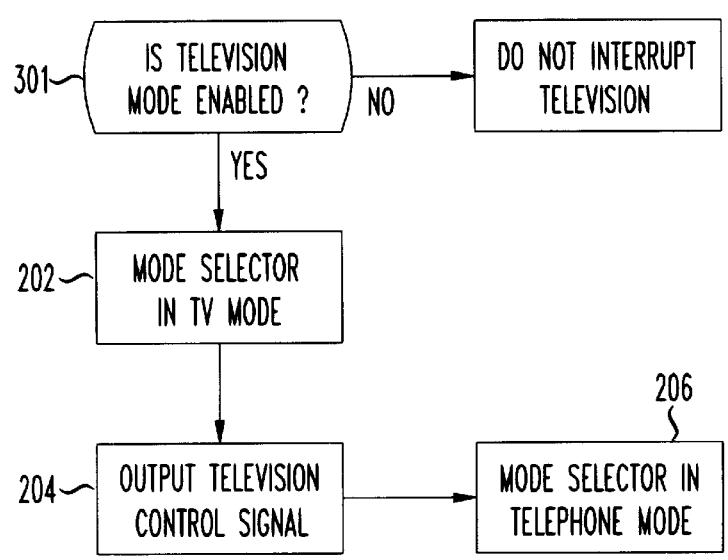
FIG. 3 is a flowchart showing an alternative method of operation of a cordless telephone handset according to the invention.

FIG. 3 provides an alternative flowchart, wherein the signal processor 111 first determines, at step 301, if the television mode is enabled prior to placing the mode selector into the television mode. According to this embodiment, the user can enable and/or disable the television control mode depending on whether the user wants an incoming call to affect the television. This concept can be further extended to allow the user to enable the television control mode only for calls received from specific predetermined call sources. According to this concept, the determination of whether the television mode is enabled can include a comparison of caller ID data received with the incoming call with a table of call sources for which television control is desired.

For example, a user can enable television control, and hence television viewing interruption, for calls received from a user's family members, based on previously programming a memory portion of signal processor 111 with caller ID information corresponding to the family members through the keypad 107. This programming process can be enhanced by incorporation of a display in cordless telephone handset 105 through which processor 111 can provide feedback to the user during the programming process. An alternative method of providing programming feedback is via the output driver 113, and second output device 117, to utilize a television screen to display programming information to the user.

Some of the above examples presume, of course, that the television is compatible with the cordless telephone handset 105, such that the television has the capability to receive and process signals from cordless telephone handset 105. In the basic example of the invention, wherein the cordless telephone handset provides the user with the ability to control a television channel by putting the mode selector 109 in the television mode and then manipulating the keypad 107, such a special purpose television is not required. All that is needed for this embodiment to function, in at least one embodiment, is a television capable of being operated by way of a remote control handset through, for example, an infrared signaling scheme. Similarly, for the embodiment of the invention in which the volume setting is controlled or muted when an incoming call is received, a special purpose television is not necessary.

In the examples where the television displays call related information such as caller ID information, or parallel set detect information, however, the television must have the ability to process the signal received from handset 105 and must further have the ability to reproduce the call related information on a display screen. Such a television can be further modified to include some of the intelligence described above with respect to FIG. 3. For example, instead of programming the processor 111 of handset 105 to discriminate between incoming calls for which television control is enabled, based on caller ID data associated with the incoming call source, the special purpose television can include the ability to compare the caller ID data associated with an incoming call with a table of approved sources for which television control is enabled. Accordingly, the handset 105 could be configured to transmit the television control signals for every call, and the television would then determine, based on an analysis of caller ID data provided to the television from the handset with the television control signals, whether to interrupt the television viewing moment for each incoming call.

The above embodiments of the invention describe various means, such as infrared transmission, that can be used to control a television or other device. Alternatively, a power grid, such as a 60 Hz power grid of a home, can be used as a means for communicating control signals to a target device. For example, a cordless telephone handset can communicate a control signal in a first form to a cordless telephone base unit. The base unit can convert the control signal to a second form and transmit this control signal onto the power grid by way of a connection to an alternating current (AC) outlet, such as through a power cord. The target device, such as a television, which is receiving power from the power grid, can receive the control signal through its connection to the power grid. Such a scheme preferably employs an addressing approach through which a device monitors the power grid and responds only to control signals addressed thereto.

Exemplary embodiments described above provide for control of the television by way of a signal, such as an infrared signal, output from the cordless telephone handset and received by the television. Alternatively, the infrared signal can be transmitted from the cordless telephone base unit, in response to control signals received from the cordless telephone handset on the RF link and decipherable as television control signals. In this example, the cordless telephone base unit, which is preferably located in line-of-sight of the television, will thus determine whether the incoming RF signal is a telephone related signal or a television related signal. If the incoming RF signal is a television related signal, the cordless telephone base unit will produce and output an infrared signal based on the incoming RF signal, such as by converting a portion of the incoming RF signal into an infrared signal, and will output the infrared signal to control the television. An advantage of this embodiment is that a user of the cordless telephone handset can control the television without first establishing line-of-sight between the handset and the television.

The above embodiments also describe the target device in terms of a television. It is understood, of course, that this is merely by way of example and not of limitation. The target device can be any home entertainment device, such as a stereo, VCR, CD player, etc. that can be remotely controlled by the cordless telephone handset, either directly, or through the base unit and/or the power grid. Further, the device need not be a home entertainment device, but may be any appliance or other device for which control is desired, such as a lamp, a garage door opener, a dishwasher, etc. For example, in one embodiment, a user can control a ceiling fan through a cordless telephone handset. The ceiling fan can be controlled directly, such as through an infrared signaling approach, or the ceiling fan can be controlled indirectly, such as through a base unit and a power grid from which the ceiling fan receives power.

We claim:

1. A cordless telephone system having a handset, the handset comprising:

a receiver adapted to receive an incoming call telephone signal;

a processor adapted to process caller ID data within the incoming call telephone signal; and a television signaling unit adapted to output a television control signal based on the caller ID data in the incoming call telephone signal.

2. A cordless telephone system as recited in claim 1, wherein the television control signal is configured to control a volume setting of a television.

3. A cordless telephone system as recited in claim 2, wherein the processor is further adapted to process parallel set detect data within the incoming call telephone signal and the television signaling unit is further adapted to output another television control signal in response to the parallel set detect data.

4. A cordless telephone system as recited in claim 3, wherein the another television control signal is configured to additionally control the volume setting of the television.

5. A cordless telephone system as recited in claim 4, wherein the another television control signal controls the volume setting to return to a state as existed prior to the output of the television control signal.

6. A cordless telephone system as recited in claim 1, wherein the television control signal is configured to cause a television to display the caller ID data.

7. A cordless telephone system as recited in claim 1, wherein the television control signal is configured to cause a television to display parallel set detect data.

8. A cordless telephone system as recited in claim 1, further comprising a mode selector, wherein the processor is adapted to place the mode selector in a television mode upon receipt of the incoming call telephone signal, and to place the mode selector in a telephone mode after outputting the television control signal.

9. A cordless telephone system as recited in claim 1, further comprising a mode sensor adapted to determine if a television mode is enabled upon receipt of the incoming call, to place the mode selector in the television mode if the television mode is enabled, and to place the mode selector in a telephone mode after outputting the television control signal.

10. A cordless telephone system as recited in claim 1, wherein the handset further comprises a memory containing called ID data for which the television signaling unit outputs the television control signal.

11. A cordless telephone system as recited in claim 1, wherein the memory is adapted to be programmed by the user.

12. A cordless telephone system as recited in claim 11, wherein the television signaling unit is adapted to output feedback signals to cause a television to display programming information.

13. A cordless telephone system is recited in claim 1, further comprising a user input unit adapted to receive audio signals and respond thereto.

14. A cordless telephone system as recited in claim 13, where in the user input unit is adapted to complete a call in response to a "yes" audio input, and to not complete the call in response to a "no" audio input.

15. A cordless telephone system as recited in claim 1, wherein the television signaling unit is adapted to output the television control signal over a power grid coupled to both the cordless telephone system and the television.

16. A cordless telephone system including a base unit and a handset, at least one of the base unit and the handset including a television control unit adapted to selectively output television control signals in response to an analysis of caller ID data contained in an incoming telephone call.

17. A cordless telephone system as recited in claim 16, wherein the television control unit is in the base unit and comprises an infrared signaling unit adapted to output television control signals in response to user input signals received from the handset.

18. A cordless telephone system as recited in claim 16, wherein the television control signal is configured to control a volume setting of a television.

19. A cordless telephone system as recited in claim 12, wherein the television control signal is adapted to cause a television to display the caller ID data.

20. A method of receiving an incoming call in a cordless telephone, comprising the steps of:
    (a) receiving an incoming call telephone signal;
    (b) determining caller ID data contained in the incoming call telephone signal; and
    (c) selectively outputting a television control signal from one of a handset and a base unit in response to an analysis of caller ID data.

21. A method of receiving an incoming call as recited in claim 20, further comprising the step of determining if the television mode is enabled prior to step (c), such that if the television mode is not enabled, the television control signal is not output.

22. A method of receiving an incoming call as recited in claim 20, wherein the television control signal is configured to control a volume setting of a television.

23. A cordless telephone system as recited in claim 22, further comprising the step of issuing another television control signal to return the volume setting to a previous state in response to a parallel set detect signal.

24. A method of receiving an incoming call as recited in claim 20, wherein the television control signal is configured to cause a television to display the caller ID data associated with the incoming call.

25. A method as recited in claim 20, further comprising the step of programming a memory to contain caller ID data, such that the outputting step occurs when the caller ID data contained in the incoming call telephone signal matches caller ID data contained in the memory.

26. A method as recited in claim 25, wherein the programming step includes outputting a feedback signal for display on a television.

27. A method of receiving an incoming call as recited in claim 20, wherein the television control signal is configured to cause a television to provide an incoming call alert signal.

28. A cordless telephone system, comprising:
    receiving means for receiving an incoming call telephone signal including caller ID data; and
    signaling means for selectively providing a television control signal in response to an analysis of caller ID data in the incoming call telephone signal.

29. A cordless telephone system as recited in claim 28, wherein the television control signal is configured to control a volume of a television.

30. A cordless telephone system as recited in claim 28, wherein the television control signal is configured to cause a television to provide an incoming call alert signal.

31. A cordless telephone system as recited in claim 28, wherein the television control signal is configured to cause a television to display the caller ID data.

32. A cordless telephone system having a handset, the handset comprising:
    a receiver adapted to receive an incoming call telephone signal;
    a processor adapted to process caller ID data within the incoming call telephone signal; and
    a television signaling unit adapted to output a television control signal configured to control a volume setting of a television in response to the incoming call telephone signal, wherein the processor is further adapted to process parallel set detect data within the incoming call telephone signal and the television signaling unit is further adapted to output another television control signal in response to the parallel set detect data.

33. A cordless telephone system as recited in claim 32, wherein the another television control signal is configured to additionally control the volume setting of the television.

34. A cordless telephone system having a handset, the handset comprising:

a receiver adapted to receive an incoming call telephone signal;

a processor adapted to process caller ID data within the incoming call telephone signal; and a television signaling unit adapted to output a television control signal in response to the incoming call telephone signal, wherein the television control signal is configured to cause a television to display parallel set detect data.

35. A cordless telephone system as recited in claim 34, wherein the parallel set detect data includes indicia of a location of a parallel set.

* * * * *